(12) United States Patent
Inoguchi

(10) Patent No.: US 9,329,390 B2
(45) Date of Patent: May 3, 2016

(54) IMAGE DISPLAY APPARATUS

(71) Applicant: CANON KABUSHIKI KAISHA, Tokyo (JP)

(72) Inventor: Kazutaka Inoguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 13/972,775

(22) Filed: Aug. 21, 2013

(65) Prior Publication Data

US 2014/0055863 A1    Feb. 27, 2014

(30) Foreign Application Priority Data

Aug. 23, 2012    (JP) ................. 2012-184012

(51) Int. Cl.

| G02B 27/10 | (2006.01) |
|---|---|
| G02B 27/14 | (2006.01) |
| G02B 27/01 | (2006.01) |
| G02B 27/00 | (2006.01) |
| G02B 3/00 | (2006.01) |
| G02B 27/12 | (2006.01) |

(52) U.S. Cl.
CPC ............ *G02B 27/017* (2013.01); *G02B 3/0056* (2013.01); *G02B 27/0081* (2013.01); *G02B 27/0172* (2013.01); *G02B 27/1066* (2013.01); *G02B 27/123* (2013.01)

(58) Field of Classification Search
CPC ... G02B 27/2214; G02B 3/0056; G02B 3/005
USPC .............................................. 359/13, 630–633
See application file for complete search history.

(56) References Cited

U.S. PATENT DOCUMENTS

| 5,982,343 | A | 11/1999 | Iba et al. | |
|---|---|---|---|---|
| 6,816,313 | B2 | 11/2004 | Hara | |
| 2009/0034082 | A1* | 2/2009 | Commander et al. | 359/619 |
| 2010/0033813 | A1* | 2/2010 | Rogoff | 359/463 |
| 2010/0208036 | A1* | 8/2010 | Kaule | B44F 1/10 348/46 |

\* cited by examiner

*Primary Examiner* — Mahidere Sahle
(74) *Attorney, Agent, or Firm* — Canon USA Inc., IP Division

(57) ABSTRACT

An image display apparatus includes an original image forming unit configured to form an identical image in each of image forming regions, and an optical system including optical elements corresponding to the respective image forming regions and configured to form exit pupils corresponding to the image forming regions each displaying the identical image.

9 Claims, 22 Drawing Sheets

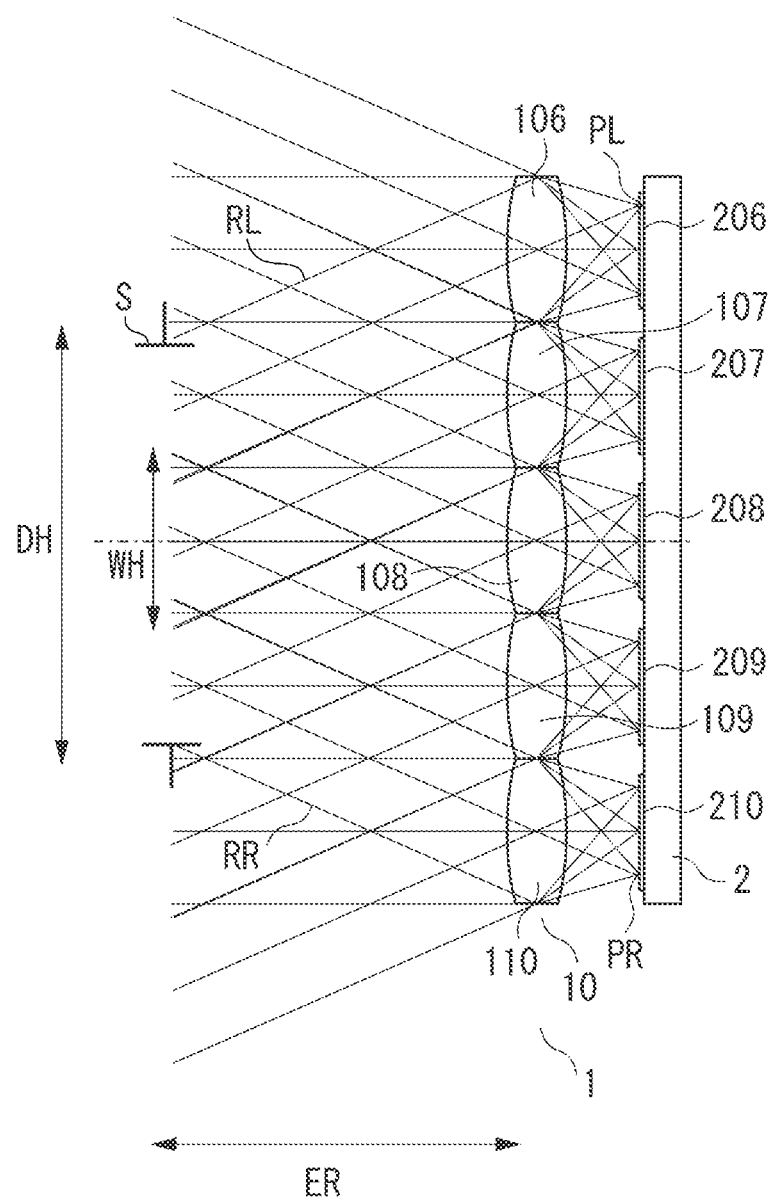

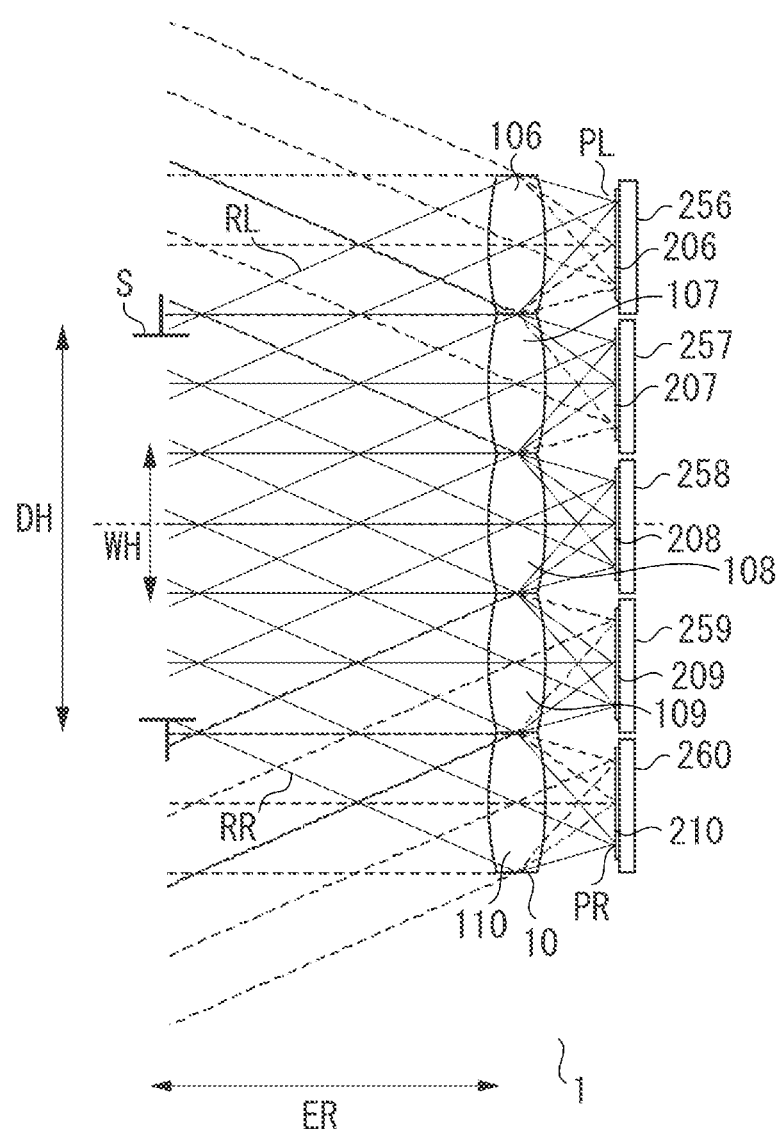

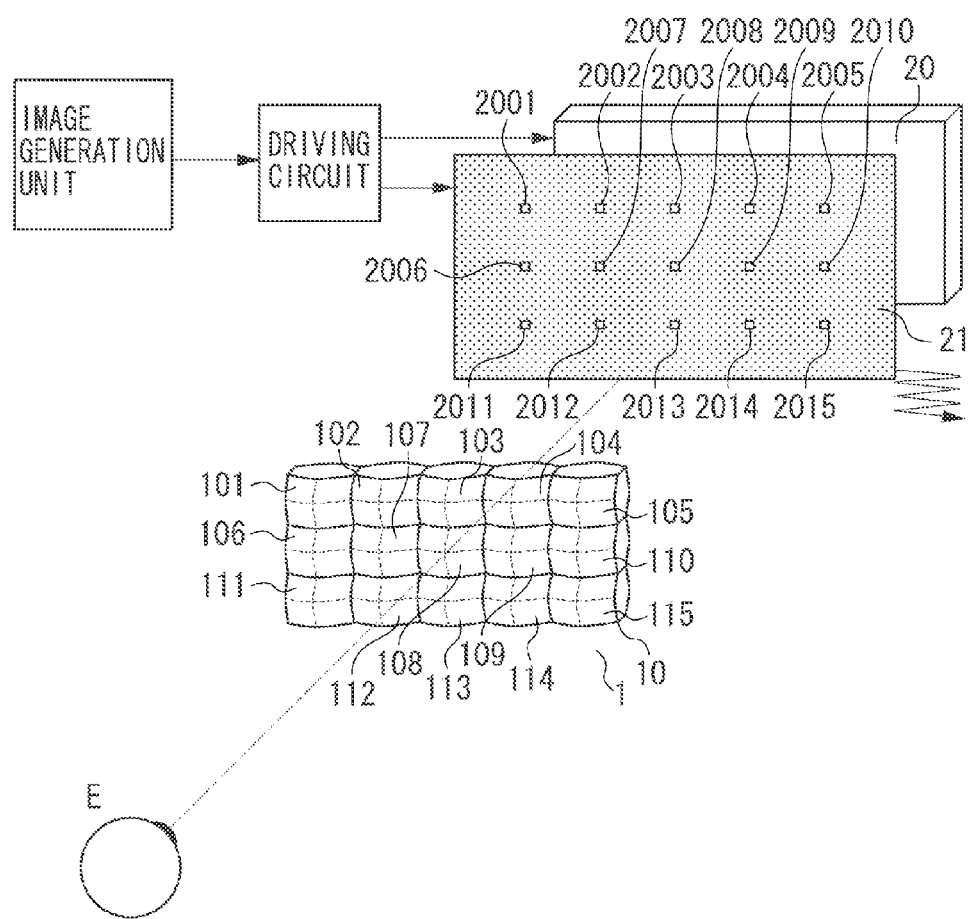

IMAGE DISPLAY APPARATUS

BACKGROUND OF THE INVENTION

1. Field of the Invention

The present invention relates to an image display apparatus that enables a magnified view of an image formed in an original image forming unit through an optical system with convenience, and, in particular, to an image display apparatus suitable for a head-mounted display (HMD).

2. Description of the Related Art

To date, an image display apparatus is known which allows an image formed in an original image forming unit to be recognized as a magnified virtual image through an optical system, such as a lens and a concave mirror. According to a technique discussed in U.S. Pat. No. 5,982,343, part of an original image is displayed on a first display unit and the remaining part thereof is displayed on a second display unit. Then, a magnified virtual image is formed through two planar half-silvered mirrors corresponding to the respective display units and a common concave mirror. Meanwhile, U.S. Pat. No. 6,816,313 discusses a technique that enables a magnified view of an original image by illuminating pixels through a barrier element and a microlens array having lenses corresponding to respective pixels of the image in the original image forming unit. However, reduction of the optical system in size and thickness is difficult with such existing techniques, or such existing techniques provide a small viewable area, and thus a viewer is unable to view the surrounding images.

In the technique discussed in U.S. Pat. No. 5,982,343 mentioned above, the original image is divided into a plurality of pieces, and thus the effective diameters of the corresponding optical system sections are smaller compared to those in a conventional configuration. However, the image displayed on the first display unit differs at least partially from the image displayed on the second display unit, and thus a light beam from only one of the displayed images needs to reach an exit pupil position. Accordingly, the effective diameters of the optical system sections corresponding to the respective images need to be greater than a necessary exit pupil diameter D.

In the technique discussed in U.S. Pat. No. 6,816,313, since the magnified view of the image is provided by the microlens array including optical elements (i.e., microlenses) that correspond to the respective pixels of the image and apertures, the width of a light beam emitted from each microlens is small, and the viewable area is small. Thus, the viewer is unable to view the surrounding images.

SUMMARY OF THE INVENTION

The present invention is directed to an image display apparatus that includes an optical system reduced in size and thickness and that provides a large viewable area to allow a viewer to view the surrounding images.

According to an aspect of the present invention, an image display apparatus includes an original image forming unit configured to form an identical image in each of image forming regions, and an optical system including optical elements corresponding to the respective image forming regions and configured to form exit pupils corresponding to the image forming regions each displaying the identical image.

Further features of the present invention will become apparent from the following description of exemplary embodiments with reference to the attached drawings.

BRIEF DESCRIPTION OF THE DRAWINGS

FIG. 2A is a sectional view of main components according to the first exemplary embodiment, taken along a horizontal plane.

FIG. 8A is a sectional view of main components according to the third exemplary embodiment, taken along a horizontal plane.

FIG. 9 is a schematic diagram of main components of an image display apparatus according to a fourth exemplary embodiment of the present invention, illustrating image viewing in the image display apparatus.

DESCRIPTION OF THE EMBODIMENTS

Figure 1A:
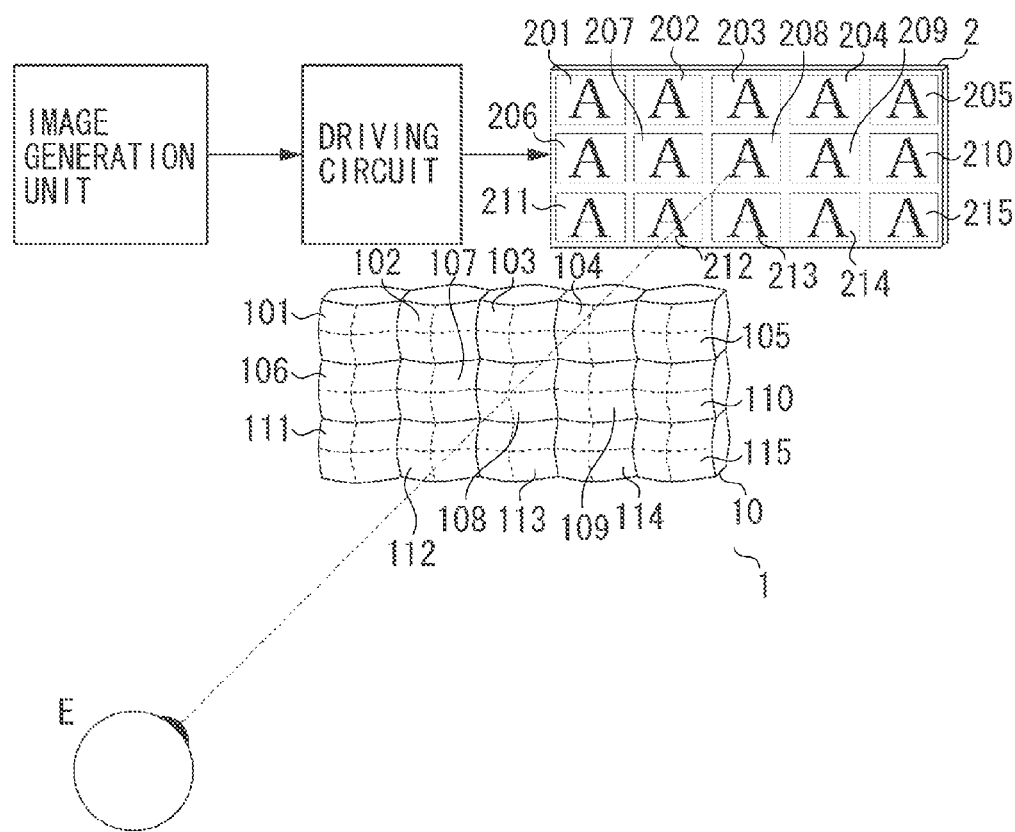
FIG. 1A is a schematic diagram of main components of an image display apparatus according to a first exemplary embodiment of the present invention, illustrating image viewing in the image display apparatus.
Figure 2B:
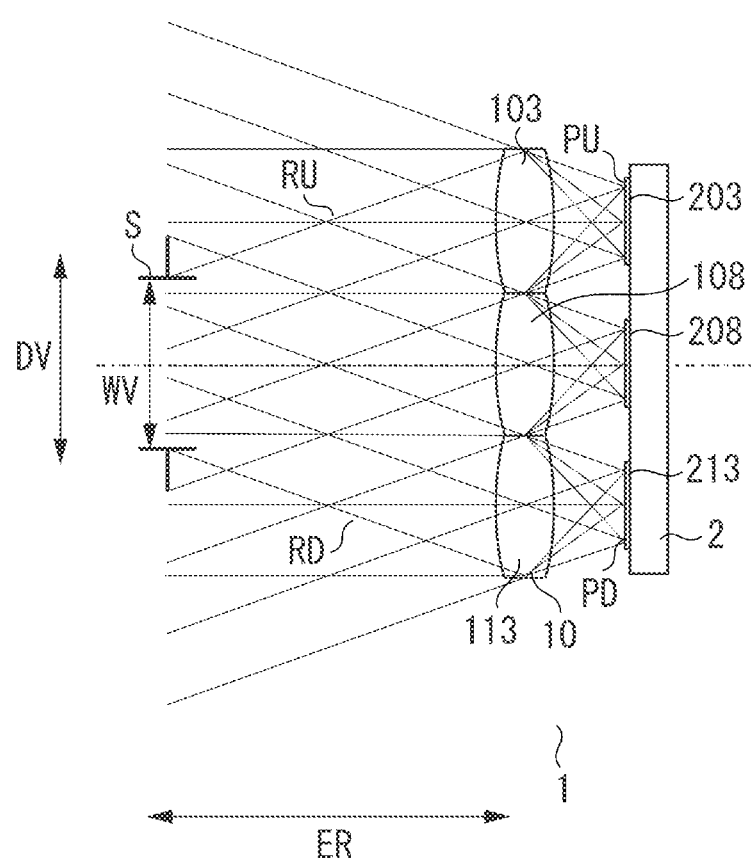
FIG. 2B is a sectional view of the main components according to the first exemplary embodiment, taken along a vertical plane.

Hereinafter, a first exemplary embodiment will be described. FIG. 1A is a schematic diagram of main components of an image display apparatus according to the first exemplary embodiment of the present invention, illustrating image viewing in the image display apparatus. FIG. 2A is a sectional view of the main components according to the first exemplary embodiment, taken along a horizontal plane, and FIG. 2B is a sectional view of the main components according to the first exemplary embodiment, taken along a vertical plane. The image display apparatus of the first exemplary embodiment includes an optical system 1 and an image display element (original image forming unit) 2.

(Image Forming Unit)

In the first exemplary embodiment, an identical image (common image) is formed in each image forming region of the single image display element 2 by a driving circuit based on information on an original image generated by an image generation unit. That is, the original image forming unit is configured to form the identical image in each of the image forming regions thereof. In the present specification, each of the identical images 201 to 215 formed in an image forming region is referred to as an image element. An image element includes a plurality of pixels necessary for forming the image. The term "identical images" is used to refer to the identical images illustrated in FIG. 1 and also to refer to substantially identical images such as those illustrated in FIG. 7.

(Optical System)

The optical system 1 of the first exemplary embodiment includes a lens array 10. The lens array 10 includes lenses 101 to 115 serving as optical elements corresponding to respective image elements 201 to 215. In the optical system 1 of the first exemplary embodiment, the lenses 101 to 115 are constituted by optical elements having the same shape.

(Exit Pupil Diameter Considering Rotation of Viewer's Eyeball)

In a head-mounted display (HMD) serving as the image display apparatus, for example, an original image forming unit is fixed relative to a viewer, and thus the image display apparatus requires an optical system having such an exit pupil diameter that allows image light to enter the viewer's eye even when the viewer's eyeball rotates to see the surroundings.

Figure 18:
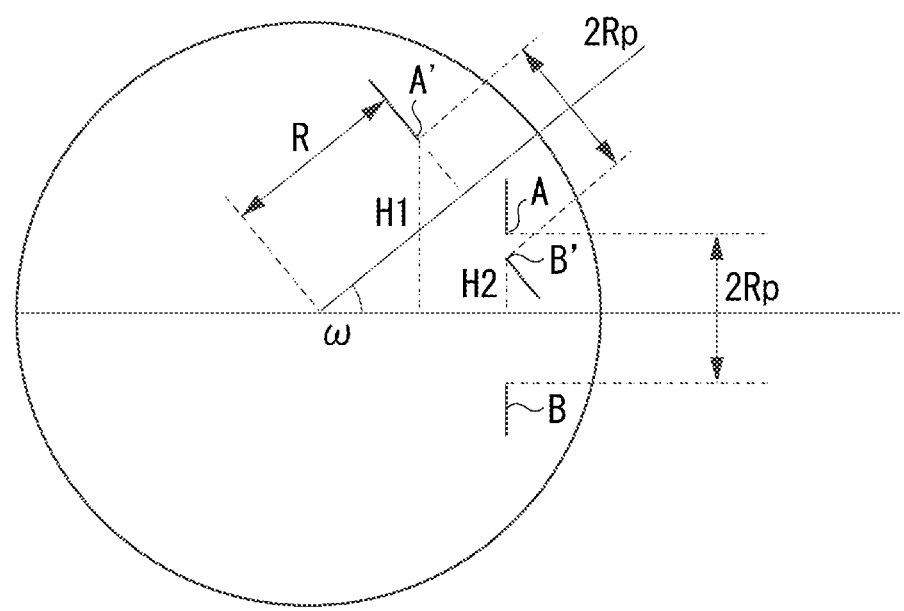
FIG. 18 is a descriptive diagram illustrating an exit pupil diameter necessary for the case where an eyeball of a viewer rotates.

That is, with reference to FIG. 18, provided that ω is a maximum angle of view (half angle of view) in the image display apparatus, Rp is a radius of a pupil of an eye of a viewer, R is a distance from the rotational center of the eyeball to the pupil of the eye, and H2 is a height, from an optical axis, of a lower end position B' of the pupil when the eyeball has rotated, an exit pupil diameter D of the optical system satisfies Expression (1) below.

$$D > 2*(R*\sin(\omega) - Rp*\cos(\omega)) \quad (1)$$

The above is derived from $H2 = R*\sin(\omega) - Rp*\cos(\omega)$, provided that $D/2 > H2$. If the exit pupil diameter D falls below 2×H2, which is a value of the right side of Expression (1), rays with the maximum angle of view do not enter the pupil of the eye of the viewer, and thus vignetting of an image occurs.

More desirably, Expression (2) below is also satisfied.

$$D > 2*R*\sin(\omega) \quad (2)$$

This at least ensures $D/2 = R*\sin(\omega)$, which is a condition to allow principal rays with the maximum angle of view to enter the center of the pupil when the eyeball has rotated.

More desirably, Expression (3) below is also satisfied.

$$D \geq 2*(R*\sin(\omega) + Rp*\cos(\omega)) \quad (3)$$

This is derived from $H1 = R*\sin(\omega) + Rp*\cos(\omega)$, provided that $D/2 \geq H1$, in which H1 is a height, from the optical axis, of an upper end position A' of the pupil when the eyeball has rotated. When Expression (3) is also satisfied, the entire rays with the maximum angle of view enter the pupil of the eye of the viewer even during viewing an area with the maximum angle of view, and thus a loss of a peripheral light amount can be suppressed. Here, the exit pupil of the optical system may be even greater, taking a shift in the image display apparatus when or while the image display apparatus is mounted into consideration.

(Enlarging a Viewable Area)

Figure 1B:
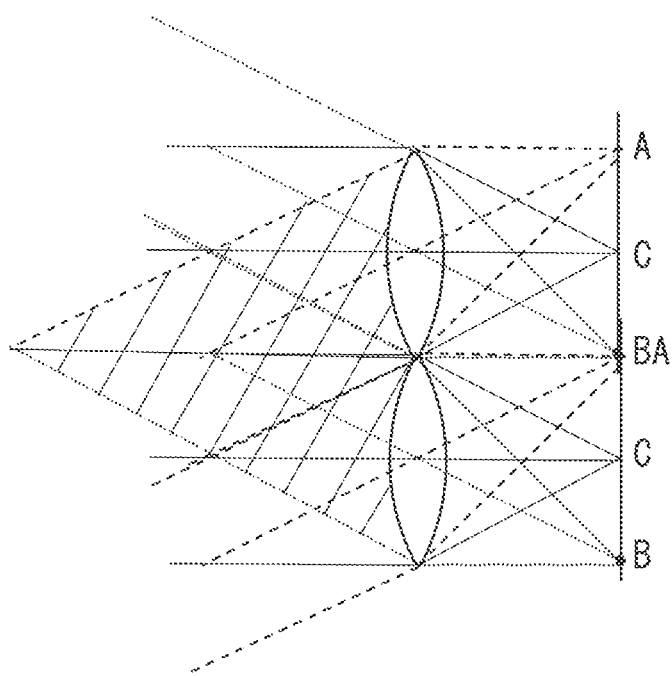
FIG. 1B illustrates a large viewable area formed by using two image forming elements and corresponding two optical elements.
Figure 1C:
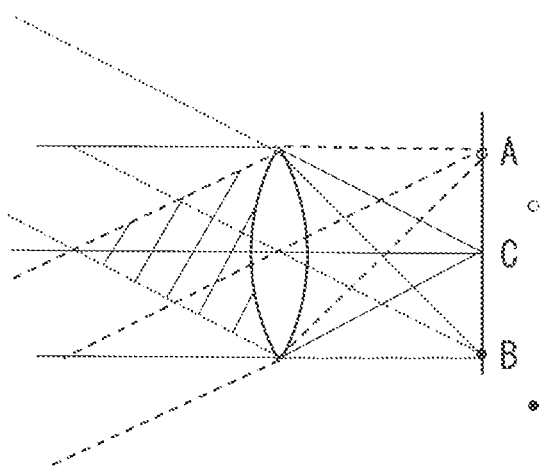
FIG. 1C illustrates a small viewable area formed by using a single image forming element and a corresponding single optical element according to a comparative example.

Here, effects of enlarging a viewable area in exemplary embodiments of the present invention will be described. FIG. 1B illustrates a large viewable area formed by using two image forming elements and corresponding two optical elements, and FIG. 1C illustrates a small viewable area formed by using a single image forming element and a corresponding single optical element according to a comparative example. An identical image is formed in each of the image forming elements, and an area, within which all of an upper end position A, a lower end position B, and a center position C of the stated identical image are viewable, is indicated with hatching. As can be seen from FIGS. 1B and 1C, the viewable area is larger in FIG. 1B than in FIG. 1C.

A larger viewable area allows a viewer to view the surrounding images even when the viewer's eyeball has rotated. In addition, a larger viewable area allows the viewer to view an image from a distanced location even when the focal length of a lens is reduced, and thus the image display apparatus can be reduced in size and thickness.

In such an image display apparatus, a predetermined distance (i.e., eye relief) needs to be secured between the optical system and the viewer's pupil. Typically, an eye relief of at least around 10 mm is required, and an eye relief of at least 15 mm or desirably of 20 mm or more is required for a viewer wearing eyeglasses.

To secure an eye relief of such an amount, the effective diameter of the optical system needs to be large in the configuration in FIG. 1C. Specifically, the effective diameter of a lens at a position distanced by an eye relief ER needs to be equal to or greater than $D + 2*ER*\tan(\omega)$. Meanwhile, the configuration in FIG. 1B allows the effective diameter of a lens to be kept at a small value.

(Effects of Lenses)

The lenses (optical elements) 101 to 115 in the lens array 10 of the first exemplary embodiment will now be described. The optical elements 101 to 115 are arranged at locations distanced from the respective image elements 201 to 215 by the focal lengths. Note that the pitch among the image elements 201 to 215 are identical to the pitch among the optical elements 101 to 115.

When a lens serving as an optical element is an ideal thin lens, a light beam emitted from a given pixel in an image element is collimated by the optical element distanced by the focal length of the lens from the image element.

(1) Effects Along Horizontal Section

Suppose an optical element is an ideal lens, a width WH of a light beam that has been emitted from a given point on an image element and collimated by the corresponding optical element is equal to the width (lens diameter) of the optical element along the section (horizontal section) illustrated in FIG. 2A. Then, a viewer whose eye is located at a position (eye point position) distanced from the optical system 1 by a predetermined distance can recognize part of the original image as an infinitely magnified virtual image via the single image element and the corresponding single optical element.

In the section illustrated in FIG. 2A, an edge pixel PL of the image element 206 corresponds to one end of the maximum angle of view, and an edge pixel PR of the image element 210 corresponds to the other end of the maximum angle of view.

A light beam that has been emitted from a given point on the pixel PL and collimated by the optical element 106 has an outer-most edge ray RL, and a light beam that has been emitted from a given point on the pixel PR and collimated by the optical element 110 has an outer-most edge ray RR. Then, a region defined by the ray RL and the ray RR at an eye point position that is distanced from the optical system 1 by a predetermined distance (i.e., eye relief) ER is an exit pupil S of the entire optical system 1. Thus, the optical system 1 as a whole has an exit pupil diameter DH along the illustrated section.

In the section illustrated in FIG. 2A, the optical system 1 and the image display element 2 are arranged such that light beams emitted from the respective image elements 206 to 210 of five identical images and then from the corresponding optical elements 106 to 110 are adjacent to one another. Configuring the five image elements 206 to 210 to have the identical images in this manner enables formation of the large exit pupil diameter DH at the eye point position.

Here, along the section illustrated in FIG. 2A, the maximum angle of view (half angle of view) is taken as $\omega H$, a pupil radius of the viewer's eye is taken as Rp, and the distance from the rotational center of the eyeball to the pupil of the eye is taken as R. Then, it is desirable that the width WH of a light beam that has been emitted from a given point on an image element and collimated by a corresponding optical element along the section (horizontal section) illustrated in FIG. 2A is smaller than $2*(R*\sin(\omega H)+Rp*\cos(\omega H))$ in the first exemplary embodiment. Satisfying this condition leads to limiting an aperture of a single optical element, and thus the focal length of the lens can be reduced to advantageously allow the optical system to be reduced in thickness. More desirably, the width WH of the stated collimated light beam is less than $2*R*\sin(\omega H)$. Even more desirably, the width WH of the collimated light beam is less than $2*(R*\sin(\omega H)-Rp*\cos(\omega H))$. As the width WH is reduced, the optical system can be reduced in thickness.

(2) Effects Along Vertical Section

Subsequently, effects along the section illustrated in FIG. 2B will be described. When a lens serving as an optical element is an ideal thin lens, a width WV of a light beam that has been emitted from a given point in an image element and collimated by the corresponding optical element is equal to the width (lens diameter) of the optical element along the section (vertical section) illustrated in FIG. 2B.

In the section illustrated in FIG. 2B, an edge pixel PU of the image element 203 corresponds to one end of the maximum angle of view, and an edge pixel PD of the image element 213 corresponds to the other end of the maximum angle of view. A light beam that has been emitted from a given point on the pixel PU and collimated by the optical element 103 has an outer-most edge ray RU, and a light beam that has been emitted from a given point on the pixel PD and collimated by the corresponding optical element 113 has an outer-most edge ray RD. Then, a region defined by the ray RU and the ray RD at an eye point position that is distanced from the optical system 1 by the predetermined distance (i.e., eye relief) ER is the exit pupil S of the entire optical system 1. Thus, the optical system 1 as a whole has an exit pupil diameter DV along the illustrated section.

In the section illustrated in FIG. 2B, the optical system 1 and the image display element 2 are arranged such that light beams emitted from the respective image elements 203, 208, and 213 of three identical images and then from the corresponding optical elements 103, 108, and 113 are adjacent to one another. Configuring the three image elements 203, 208, and 213 to have the identical images in this manner enables formation of the large exit pupil diameter DV at the eye point position.

Here, in the section (vertical section) illustrated in FIG. 2B in the first exemplary embodiment, the maximum angle of view (half angle of view) is taken as $\omega V$. Then, it is desirable that the width WV of the collimated light beam along the section (vertical section) illustrated in FIG. 2B is also less than $2*(R*\sin(\omega V)+Rp*\cos(\omega V))$. Satisfying this condition leads to limiting an aperture of a single optical element, and thus the focal length of the lens can be reduced to advantageously allow the optical system to be reduced in thickness.

More desirably, the width WV of the stated collimated light beam is less that $2*R*\sin(\omega V)$. Even more desirably, the width WV of the collimated light beam is less that $2*(R*\sin(\omega V)-Rp*\cos(\omega V))$. As the width WV is reduced, the optical system can be reduced in thickness.

(Effects of the Present Exemplary Embodiment)

As described thus far, although a set of a single image element and a corresponding single optical element only allows part of an original image to be recognized as a magnified virtual image, arranging a plurality of such sets two-dimensionally in the horizontal direction and the vertical direction allows the entire original image to be recognized as a magnified virtual image. In addition, even if the width of a light beam that has been emitted from a given point on an image element and has passed through a corresponding optical element is small, a large exit pupil diameter necessary for image viewing is achieved with the entire optical system.

In addition, since the lens has a small diameter, a relatively large angle of view can easily be realized. Here, the influence of aberration is determined by an F-number, and thus, if high optical performance is required, an optical system that has a large angle of view and has a certain thickness (i.e., long focal length), or an optical system that does not have such a large angle of view but is thin (i.e., short focal length) can be selected as appropriate.

When each optical element is constituted by a single lens as in the first exemplary embodiment, the F-number is desirably set to approximately 2 or more. However, if aberration is to be corrected by constituting each optical element by a plurality of lenses, high optical performance can be achieved even if the F-number of the optical element is small. Accordingly, the first exemplary embodiment can advantageously realize an image display apparatus that is thin, has a large angle of view, and has a large exit pupil diameter.

Figure 5:
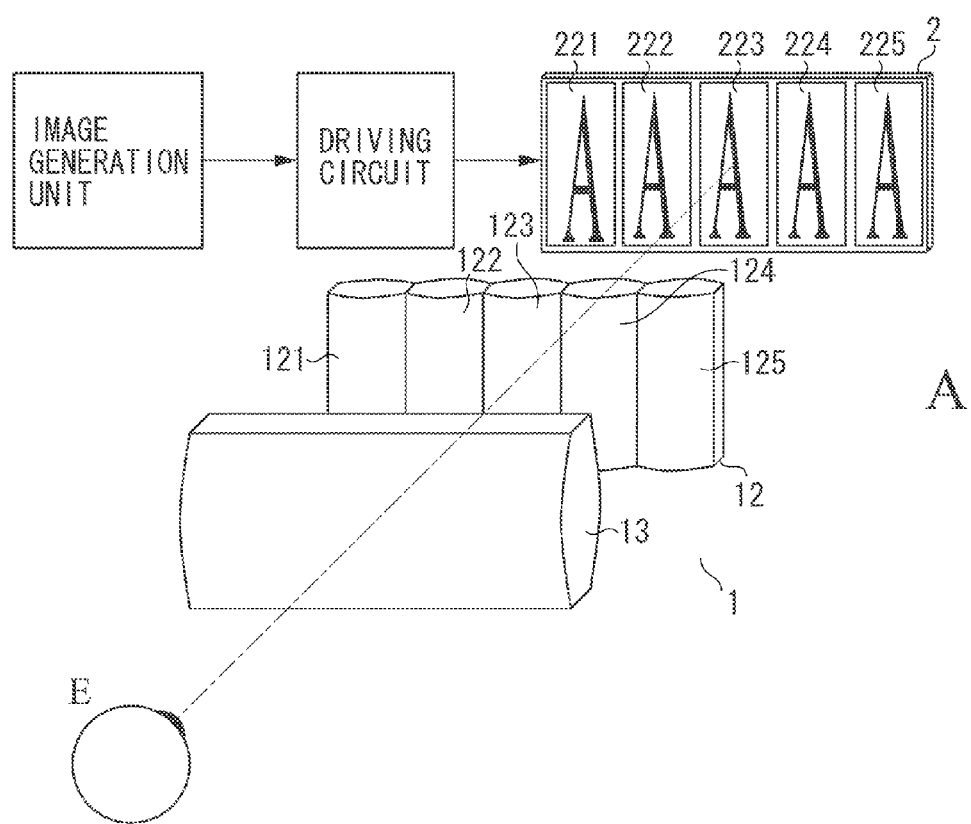
FIG. 5 is a schematic diagram of main components of an image display apparatus according to a second exemplary embodiment of the present invention, illustrating image viewing in the image display apparatus.

Hereinafter, a second exemplary embodiment will be described. FIG. 5 is a schematic diagram of main components of an image display apparatus according to a second exemplary embodiment of the present invention, illustrating image viewing in the image display apparatus.

Figure 6A:
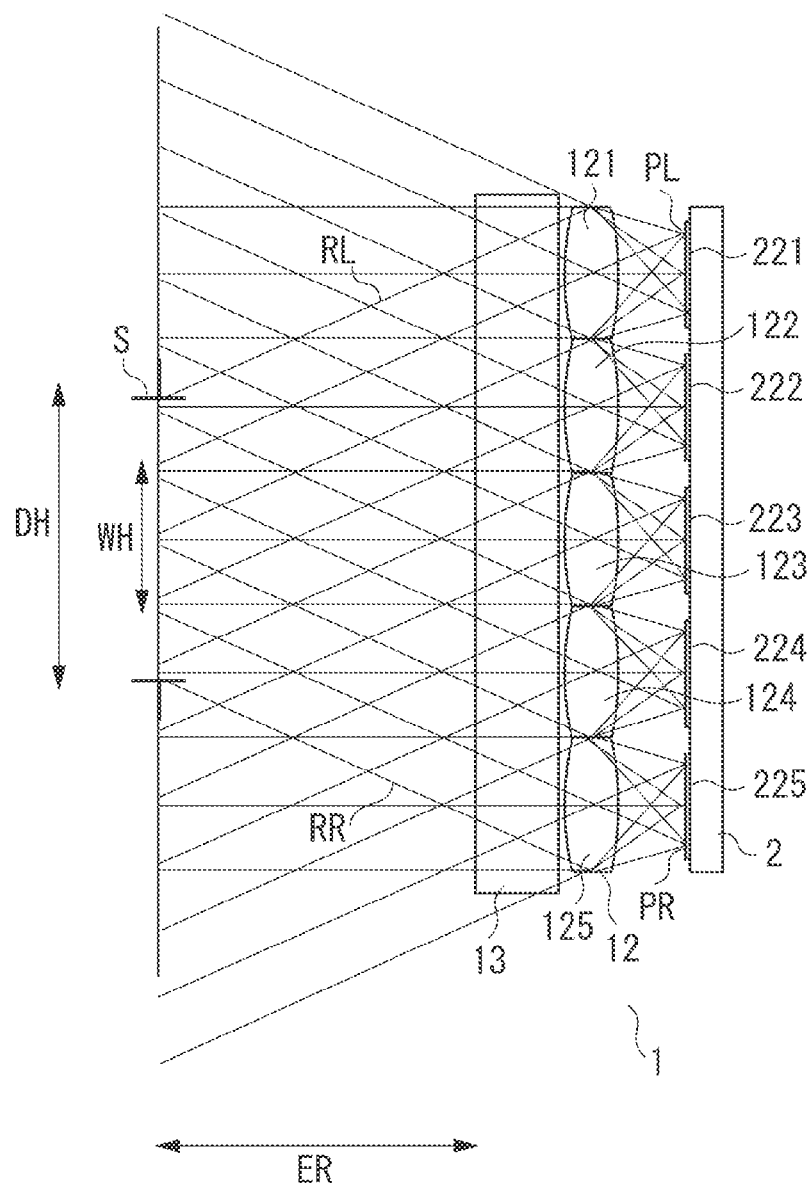
FIG. 6A is a sectional view of main components according to the second exemplary embodiment, taken along a horizontal plane.
Figure 6B:
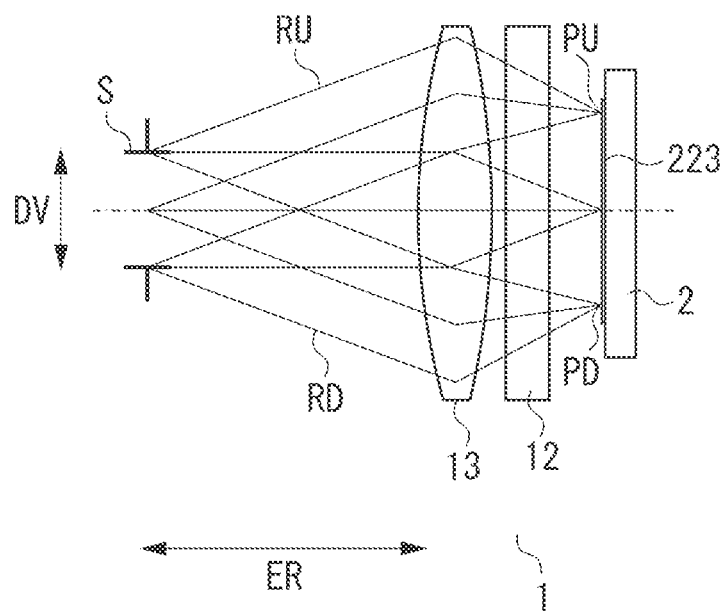
FIG. 6B is a sectional view of the main components according to the second exemplary embodiment, taken along a vertical plane.

FIG. 6A is a sectional view of the main components according to the second exemplary embodiment, taken along a horizontal plane, and FIG. 6B is a sectional view of the main components according to the second exemplary embodiment, taken along a vertical plane. The image display apparatus of the second exemplary embodiment includes an optical system 1 and an image display element 2. The optical system 1 includes a cylindrical lens array 12 and a cylindrical lens 13. The cylindrical lens array includes cylindrical lenses 121 to 125 serving as optical elements that are arranged in the horizontal direction and each has a power in the horizontal direction. The cylindrical lens 13 has a power in the vertical direction.

The image display element 2 includes image elements 221 to 225 each having a rectangular shape. Information on an original image generated by an image generation unit is formed as identical images in respective image forming regions of the single image display element 2 via a driving circuit. In the second exemplary embodiment, each of the image elements 221 to 225 is formed such that the aspect ratio thereof is modified from that of the original image.

(Effects Along Horizontal Section)

Effects of the optical system 1 of the second exemplary embodiment along the section illustrated in FIG. 6A will now be described. In the second exemplary embodiment as well, the optical elements 121 to 125 are arranged at locations distanced from the respective image elements 221 to 225 by the focal lengths. In addition, the pitch among the image elements 221 to 225 are identical to the pitch among the optical elements 121 to 125 in the second exemplary embodiment as well. Accordingly, in the second exemplary embodiment, light beams emitted from given points in the respective image elements 221 to 225 are converted into collimated light beams each having a width WH by the corresponding cylindrical lenses 121 to 125 serving as the optical elements. Light beams that have passed through the cylindrical lens array 12 simply pass through the cylindrical lens 13 that does not have a power along the horizontal section.

Suppose each of the cylindrical lenses 121 to 125 is an ideal thin lens, light beams emitted from points corresponding to identical pixels on the respective image elements 221 to 225 are emitted from the optical system 1 as a collimated light beam having a width of 5*WH in a predetermined direction. In the section illustrated in FIG. 6A, an edge pixel PL of the image element 221 corresponds to one end of the maximum angle of view, and an edge pixel PR of the image element 225 corresponds to the other end of the maximum angle of view. A light beam that has been emitted from a given point on the pixel PL and collimated by the corresponding optical element 121 has an outer-most edge ray RL, and a light beam that has been emitted from a given point on the pixel PR and collimated by the corresponding optical element 125 has an outer-most edge ray RR.

Then, a region defined by the ray RL and the ray RR at a position that is distanced from the optical system 1 by a predetermined distance (i.e., eye relief) ER is an exit pupil S of the entire optical system 1. Thus, the optical system 1 as a whole has an exit pupil diameter DH along the illustrated section. Accordingly, a viewer whose eye is located within a range of the exit pupil S (eye point position) can recognize the light beams from the pixels of the image elements 221 to 225 along the illustrated section as light beams having different angles from the infinity.

In the section illustrated in FIG. 6A, the optical system 1 and the image display element 2 are arranged such that light beams emitted from the respective image elements 221 to 225 of five identical images and then from the corresponding optical elements 121 to 125 are adjacent to one another. Configuring the five image elements 221 to 225 to have the identical images in this manner enables formation of the large exit pupil diameter DH at the eye point position.

It is desirable that the width WH of a light beam that has been emitted from a given point on an image element and collimated by a corresponding optical element along the section (horizontal section) illustrated in FIG. 6A is smaller than $2*(R*\sin(\omega H)+Rp*\cos(\omega H))$ in the second exemplary embodiment as well. Satisfying this condition leads to limiting an aperture of a single optical element, and thus the focal length of the lens can be reduced to advantageously allow the optical system to be reduced in thickness.

More desirably, the width WH of the stated collimated light beam is less than $2*R*\sin(\omega H)$. Even more desirably, the width WH of the collimated light beam is less than $2*(R*\sin(\omega H)-Rp*\cos(\omega H))$. As the width WH is reduced, the optical system can be reduced in thickness.

(Effects Along Vertical Section)

Effects of the optical system 1 of the second exemplary embodiment along the section illustrated in FIG. 6B will now be described. A light beam emitted from the image element 223 passes through the cylindrical lens array 12 while remaining as a divergent light beam without being affected by the cylindrical lens array 12 that does not have a power in the vertical direction, and then is incident on the cylindrical lens 13. The cylindrical lens 13 is disposed at a location distanced from the image element 223 by an optical path length equivalent to the focal length of the cylindrical lens 13 along the vertical section, and collimates the light beam from a given point on the image element 223. In the vertical section, the cylindrical lens array 12 and the cylindrical lens 13 each have an effective diameter that is equal to or greater than the width DV relative to the width of the image element 223.

In the section illustrated in FIG. 6B, an edge pixel PU of the image element 223 corresponds to one end of the maximum angle of view, and an edge pixel PD of the image element 223 corresponds to the other end of the maximum angle of view. A light beam that has been emitted from a given point on the pixel PU and collimated by the cylindrical lens 13 has an outer-most edge ray RU, and a light beam that has been emitted from a given point on the pixel PD and collimated by the cylindrical lens 13 has an outer-most edge ray RD. Then, the ray RU and the ray RD form the exit pupil S having the width DV at a position that is distanced from the optical system 1 by the predetermined distance (i.e., eye relief) ER.

Accordingly, a viewer whose eye is located within a range of the exit pupil S (eye point position) distanced from the optical system 1 by the predetermined distance ER can recognize the light beams emitted from different pixels on the image element 223 as collimated light beams from different directions along the illustrated section.

At this point, the focal length of each of the cylindrical lenses 121 to 125 in the horizontal direction is taken as fH, and the focal length of the cylindrical lens 13 in the vertical direction is taken as fV. The size of an original image in the horizontal direction is taken as IH, and the size of the original image in the vertical direction is taken as IV. The size of a single image element in the horizontal direction is taken as IIH, and the size of the single image element in the vertical direction is taken as IIV. Then, the following relationship is to be established between the maximum angles of view (half angles of view) ωH and ωV along the respective sections.

$$\tan(\omega H):\tan(\omega V)=IH:IV$$

$$fH*\tan(\omega)H:fV*\tan(\omega V)=IIH:IIV$$

The aspect ratio at which the original image is converted into an image element or the focal lengths fH and fH are selected to satisfy the above relationship.

With the above-described effects of the optical system 1 in the horizontal direction and the vertical direction, the viewer can recognize an infinitely magnified virtual image of an original image within the rectangular exit pupil S defined by the width DH and the width DV.

According to the second exemplary embodiment, a large exit pupil can be formed at least in the horizontal direction by using an image element and a plurality of optical elements each being somewhat wider than the image element.

Furthermore, according to the second exemplary embodiment, the plurality of image elements and the plurality of optical elements are arranged in the horizontal direction, which typically has a wider angle of view, and thus the distance between the optical system 1 and the image display element 2 can be reduced.

Figure 7:
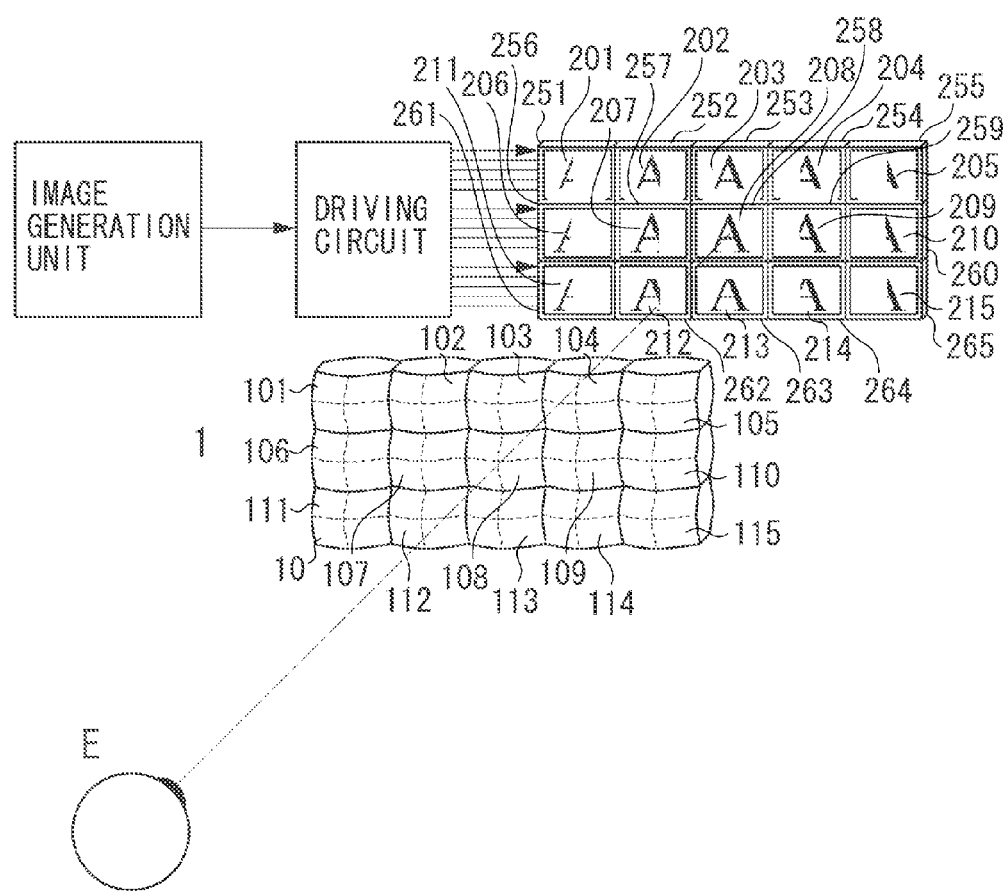
FIG. 7 is a schematic diagram of main components of an image display apparatus according to a third exemplary embodiment of the present invention, illustrating image viewing in the image display apparatus.
Figure 8B:
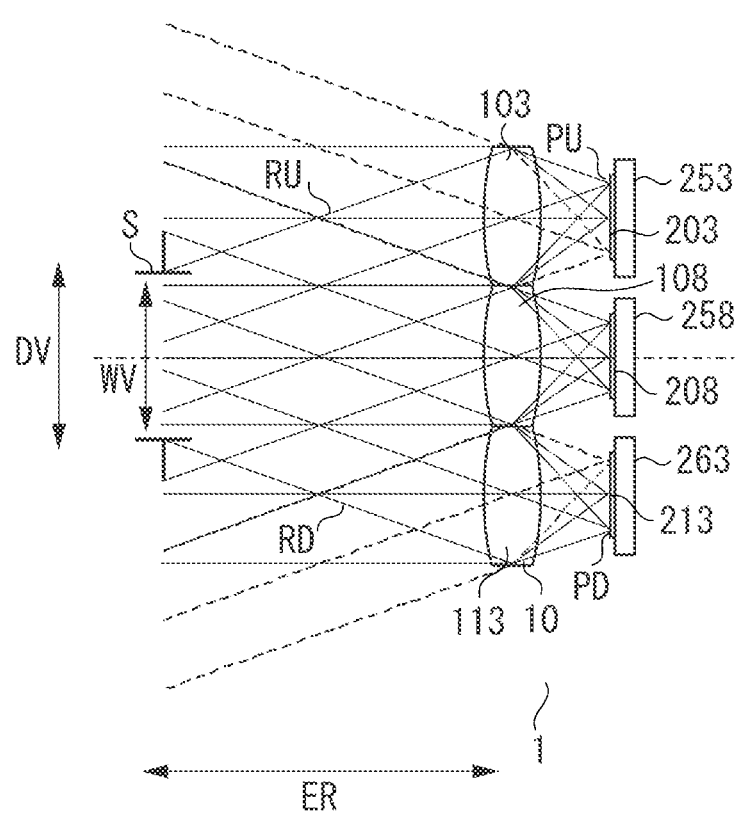
FIG. 8B is a sectional view of the main components according to the third exemplary embodiment, taken along a vertical plane.

Hereinafter, a third exemplary embodiment will be described. FIG. 7 is a schematic diagram of main components of an image display apparatus according to the third exemplary embodiment of the present invention, illustrating image viewing in the image display apparatus. FIG. 8A is a sectional view of the main components according to the third exemplary embodiment, taken along a horizontal plane, and FIG. 8B is a sectional view of the main components according to the third exemplary embodiment, taken along a vertical plane. The image display apparatus of the third exemplary embodiment includes image display elements 251 to 265. The third exemplary embodiment differs from the first exemplary embodiment in that, although the image elements 201 to 215 are formed in the respective image forming regions in the single image display element 2 in the first exemplary embodiment, the image elements 201 to 215 are formed in the respective image display elements 251 to 265 in the third exemplary embodiment.

In addition, the image elements 201 to 215 are not physically identical to one another but are substantially identical to one another, and part of each of the image elements 201 to 215 is omitted from the original image. Other configurations are basically the same as those of the first exemplary embodiment, and thus the description thereof will not be repeated.

Effects of lenses (optical elements) in a lens array of the third exemplary embodiment will now be described. In the third exemplary embodiment as well, the optical elements 101 to 115 are arranged at locations distanced from the respective image elements 201 to 215 by the focal lengths. In addition, the pitch among the image elements 201 to 215 are identical to the pitch among the optical elements 101 to 115.

(Effects Along Horizontal Section)

Effects along the section (horizontal section) illustrated in FIG. 8A will now be described. When a lens serving as an optical element is an ideal thin lens, a light beam emitted from one pixel in an image element is collimated by the optical element distanced by the focal length of the lens. Similarly, when the optical element is the ideal lens, a width WH of a light beam that has been emitted from a given point on an image element and collimated by the corresponding optical element is equal to the width (lens diameter) of the optical element along the section (horizontal section) illustrated in FIG. 8A.

A viewer whose eye is located at a position (eye point position) distanced from the optical system 1 by a predetermined distance can recognize part of the original image as an infinitely magnified virtual image via the single image element and the corresponding single optical element. In the section illustrated in FIG. 8A, an edge pixel PL of the image element 206 corresponds to one end of the maximum angle of view, and an edge pixel PR of the image element 210 corresponds to the other end of the maximum angle of view. A light beam that has been emitted from a given point on the pixel PL and collimated by the corresponding optical element 106 has an outer-most edge ray RL, and a light beam that has been emitted from a given point on the pixel PR and collimated by the corresponding optical element 110 has an outer-most edge ray RR.

Then, a region defined by the ray RL and the ray RR at an eye point position that is distanced from the optical system 1 by a predetermined distance (i.e., eye relief) ER is an exit pupil S of the entire optical system 1. Thus, the optical system 1 as a whole has an exit pupil diameter DH along the illustrated section.

In the section illustrated in FIG. 8A, the optical system 1 and the image display element 2 are arranged such that light beams emitted from identical pixel portions of the five respective image elements 206 to 210 and then from the corresponding optical elements 106 to 110 are adjacent to one another. In the third exemplary embodiment, unlike the first exemplary embodiment, the image elements 206, 207, 209, and 210 each include a region in which part of the image is not displayed. In FIG. 8A, light beams that are to be present if light beams are emitted from the regions, in which the images are not displayed, are indicated by broken lines. However, these light beams are not to reach the range of the pupil diameter DH of the exit pupil S, and thus these regions can be set as image non-display regions in the third exemplary embodiment.

However, identical images need to be formed in at least three image forming regions. In this way, by keeping the width WH of the collimated light beam that has been emitted from a given point on an image element and collimated by a corresponding optical element small relative to the exit pupil diameter DH, a large exit pupil diameter DH is formed at the eye point position while reducing the optical system in thickness.

(Effects Along Vertical Section)

Subsequently, effects along the section illustrated in FIG. 8B will be described. When a lens serving as an optical element is an ideal thin lens, a width WV of a light beam that has been emitted from a given point on an image element and collimated by the corresponding optical element is equal to the width (lens diameter) of the optical element along the section (vertical section) illustrated in FIG. 8B.

In the section illustrated in FIG. 8B, an edge pixel PU of the image element 203 corresponds to one end of the maximum angle of view, and an edge pixel PD of the image element 213 corresponds to the other end of the maximum angle of view. A light beam that has been emitted from a given point on the pixel PU and collimated by the corresponding optical element 103 has an outer-most edge ray RU, and a light beam that has been emitted from a given point on the pixel PD and collimated by the corresponding optical element 113 has an outer-most edge ray RD. Then, a region defined by the ray RU and the ray RD at an eye point position that is distanced from the optical system 1 by the predetermined distance (i.e., eye relief) ER is the exit pupil S of the entire optical system 1. Thus, the optical system 1 as a whole has an exit pupil diameter DV along the illustrated section.

In the section illustrated in FIG. 8B, the optical system 1 and the image display elements 251 to 265 are arranged such that light beams emitted from the respective image elements 203, 208, and 213 of three identical images and then from the corresponding optical elements 103, 108, and 113 are adjacent to one another. However, similarly to the horizontal section, the image elements 203 and 213 each include a region in which part of the image is not displayed, and light beams that are to be emitted from these regions are indicated by broken lines. Although the light beams are not present in the stated regions since the images are not displayed therein, even if the light beams from these regions are present, the light beams do not reach the exit pupil S, and thus the absence of the stated light beams do not hinder image viewing. Although the image elements 203 and 213 include image non-display regions, configuring the three image elements 203, 208, and 213 to have the identical images in this manner enables formation of the large exit pupil diameter DV at the eye point position.

(Effects of the Present Exemplary Embodiment)

In the third exemplary embodiment as well, similarly to the first exemplary embodiment, although a set of a single image element and a corresponding single optical element only allows part of an original image to be recognized as a magnified virtual image, arranging a plurality of such sets two-dimensionally in the horizontal direction and the vertical direction allows the entire original image to be recognized as a magnified virtual image. In addition, even if the width of a light beam that has been emitted from a given point on an image element and has passed through a corresponding optical element is small, a large exit pupil diameter necessary for image viewing can be achieved with the entire optical system. Furthermore, since the lens has a small diameter, a relatively large angle of view can be realized.

Hereinafter, a fourth exemplary embodiment will be described. FIG. 9 is a schematic perspective view of main components of an image display apparatus according to the fourth exemplary embodiment of the present invention, illustrating image viewing in the image display apparatus. The image display apparatus of the fourth exemplary embodiment includes a surface light source 20 and a mask 21 having apertures 2001 to 2015. The surface light source 20 is configured to be capable of blinking at high speed. The mask 21 is configured to block light except in areas where the fine apertures 2001 to 2015 are formed, and configured to swing two-dimensionally in the horizontal and vertical directions.

Information on an original image formed in the image generation unit is transmitted to a driving circuit, and the driving circuit controls the blinking of the surface light source 20 and the swinging of the mask 21. By blinking the surface light source 20 appropriately in accordance with the positions of the fine apertures 2001 to 2015, image elements 201 to 215 are formed by the surface light source 20 and the mask 21. These image elements 201 to 215 are recognized as a magnified virtual image via the optical elements 101 to 115 of the optical system 1 in the same mechanism as that in the first exemplary embodiment.

Figure 10:
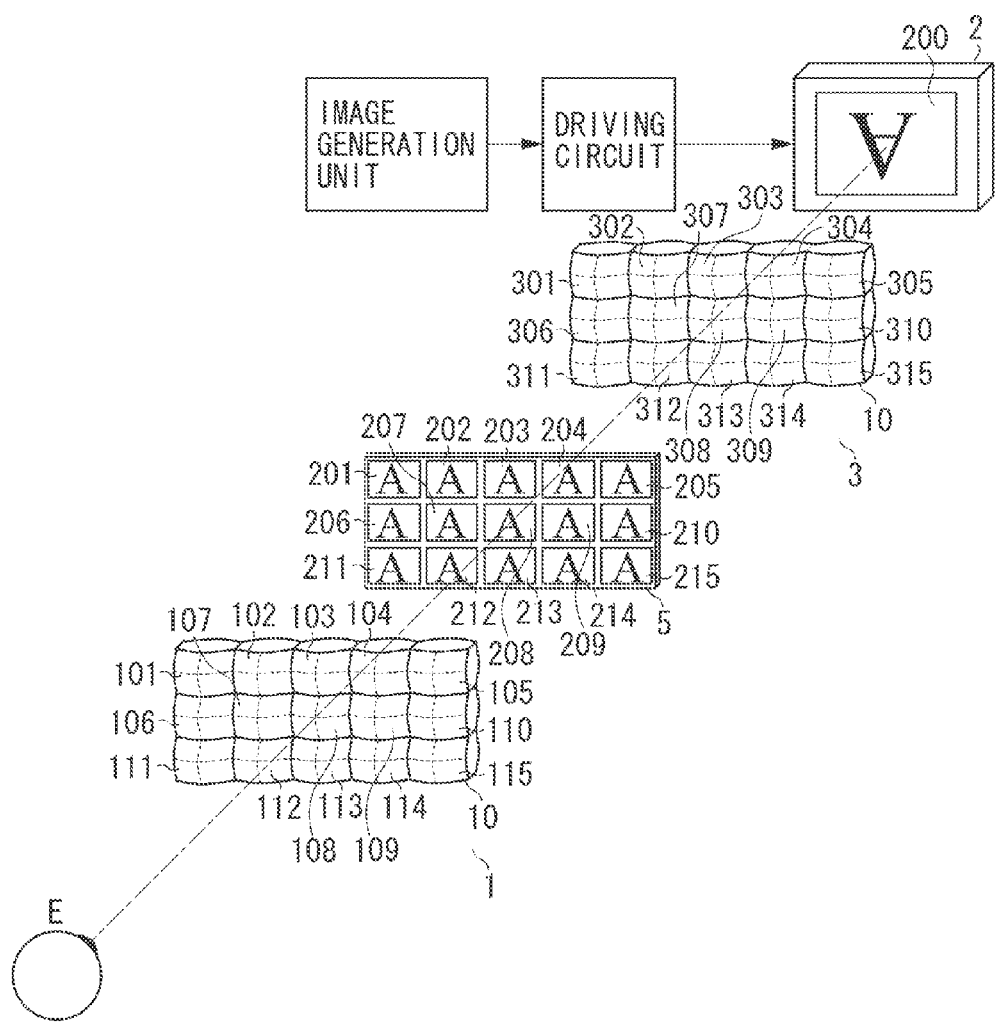
FIG. 10 is a schematic diagram of main components of an image display apparatus according to a fifth exemplary embodiment of the present invention, illustrating image viewing in the image display apparatus.
Figure 11:
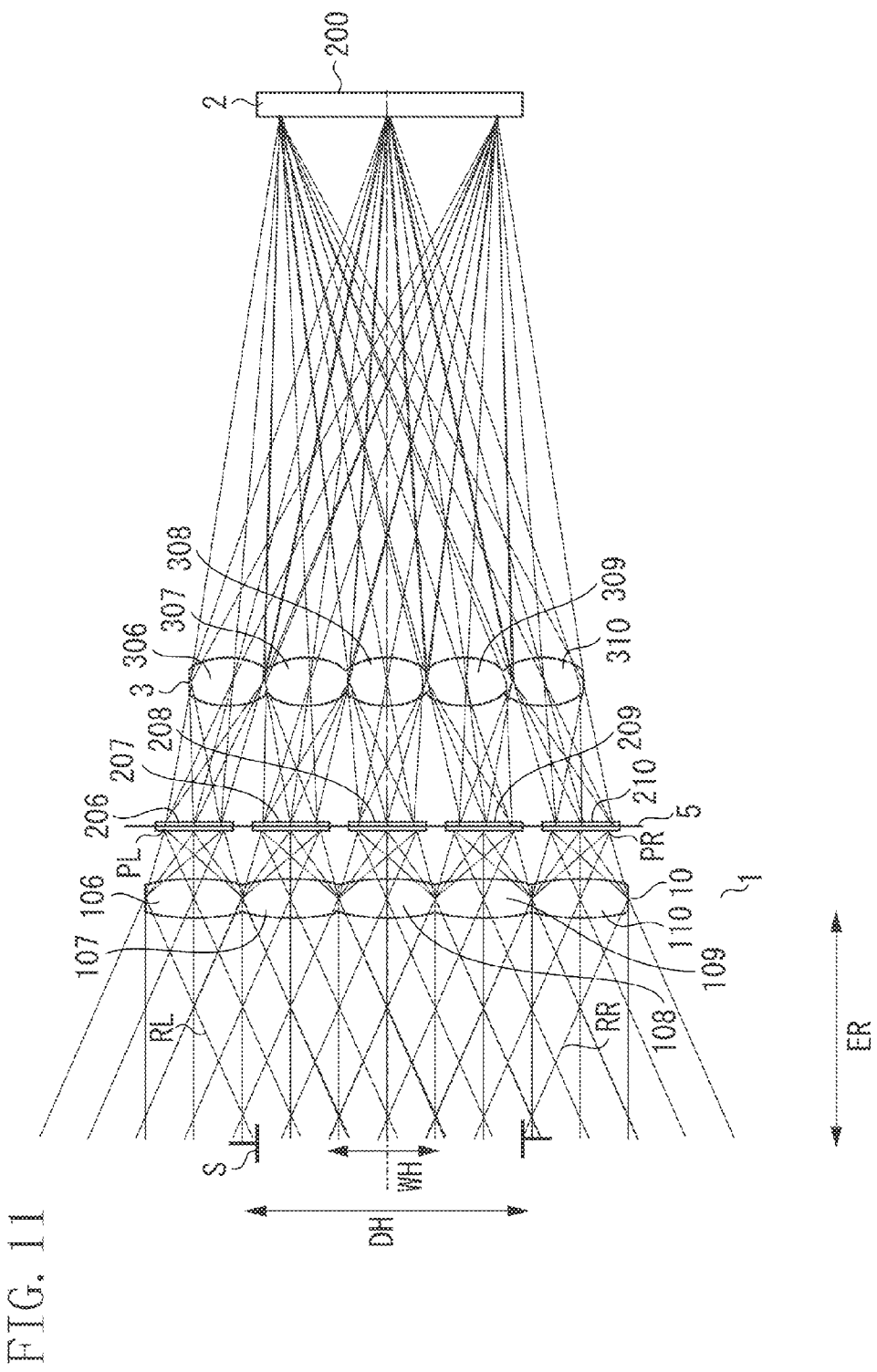
FIG. 11 is a sectional view of main components according to the fifth exemplary embodiment of the present invention, taken along a horizontal plane.

Hereinafter, a fifth exemplary embodiment will be described. FIG. 10 is a schematic perspective view of main components of an image display apparatus according to the fifth exemplary embodiment of the present invention, illustrating image viewing in the image display apparatus. FIG. 11 is a sectional view of the main components according to the fifth exemplary embodiment of the present invention, taken along a horizontal plane. The image display apparatus of the fifth exemplary embodiment includes an original image 200 formed on the image display element 2, a second optical system 3, and a screen 5. The second optical system 3 is a lens array having lenses 301 to 315 serving as optical elements. The fifth exemplary embodiment differs from the first exemplary embodiment in that image elements 201 to 215 are projected and formed on the screen 5 by the second optical system 3 based on the original image 200 formed on the image display element 2. Other configurations are identical to those in the first exemplary embodiment, and thus the description thereof will not be repeated.

As can be seen from the section illustrated in FIG. 11, an image of the original image 200 is formed as the image element 206 by the lens 306, as the image element 207 by the lens 307, and so on. That is, the image elements 201 to 215 are formed respectively by the corresponding optical elements 301 to 315. Accordingly, the original image 200 on the image display element 2 is imaged as the reduced image elements 201 to 215 on the screen 5 by the second optical system 3. These image elements 201 to 215 are to be recognized as a magnified virtual image in the same mechanism as that in the first exemplary embodiment.

According to the configuration of the fifth exemplary embodiment, the plurality of image elements are formed via the optical system using the image display element a pixel count of which is smaller than a pixel count necessary for constituting the plurality of image elements. In other words, the image display element includes a pixel count that is smaller than a product of the number of image forming regions for displaying the aforementioned identical images and the pixel count in each image forming region. Accordingly, the production cost of the image display element can be reduced.

Figure 12:
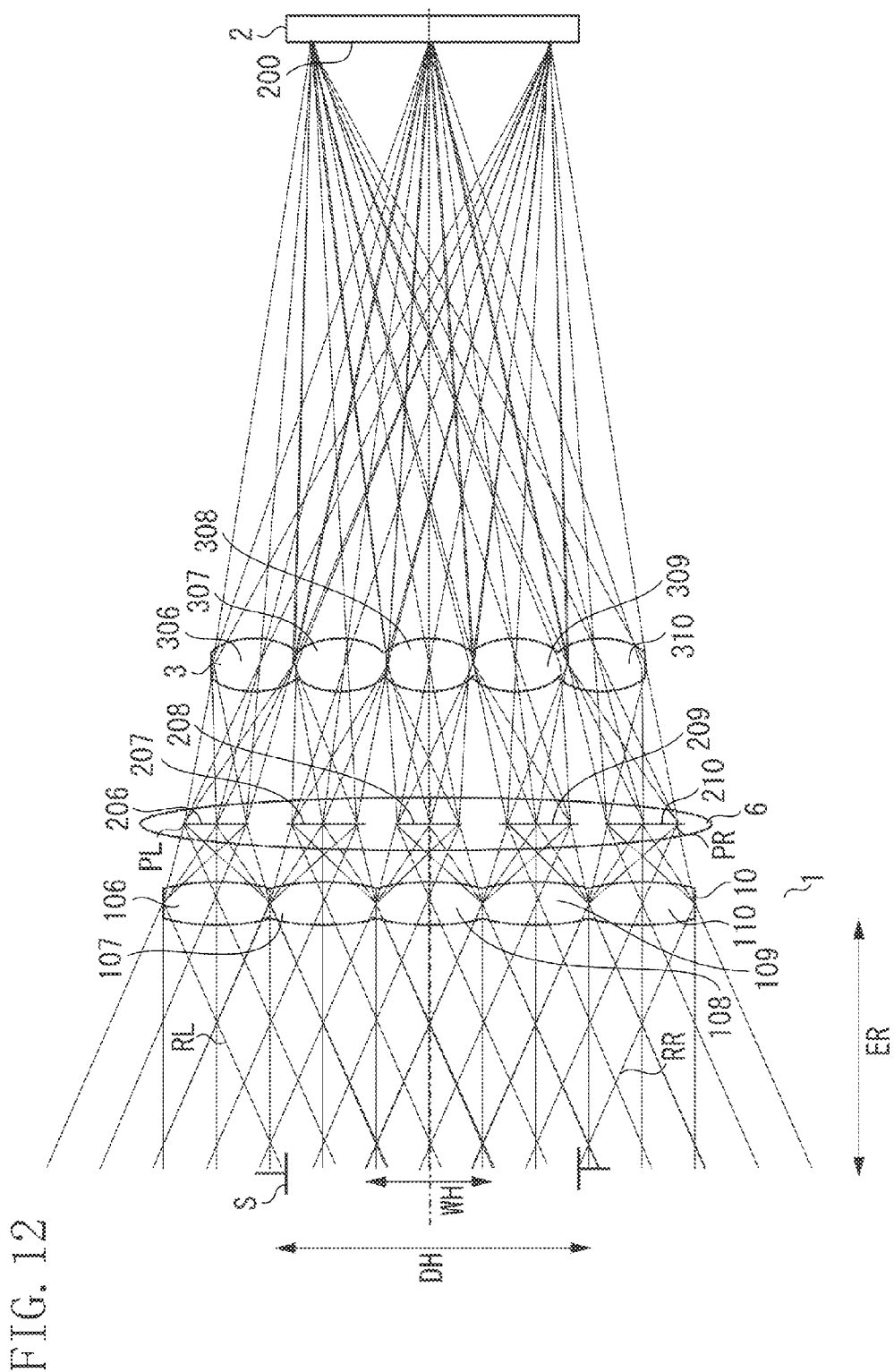
FIG. 12 is a sectional view of main components of an image display apparatus according to a sixth exemplary embodiment of the present invention, taken along a horizontal plane.

Hereinafter, a sixth exemplary embodiment will be described. FIG. 12 is a sectional view of main components of an image display apparatus according to the sixth exemplary embodiment of the present invention, taken along a horizontal plane. The sixth exemplary embodiment differs from the fifth exemplary embodiment in that, although the change in the travel directions of the light beams necessary for forming the exit pupil S by the optical system 1 is made via the diffusion effect of the screen 5 in the fifth exemplary embodiment, a field lens 6, instead of the screen 5, is used in the sixth exemplary embodiment. The field lens 6 illustrated in FIG. 12 is configured to change the travel directions of the light beams for forming the image elements by the optical system 3 and to guide the light beams from the optical system 1 to the exit pupil S. With this configuration, a viewer whose pupil of the eye is located at the position of the exit pupil S of the optical system 1 can recognize an infinitely formed virtual image without any problem. More desirably, an optical system such as a lens array having a plurality of optical elements may be used as the field lens 6 so that the light beams corresponding to each image element are deflected in directions necessary for forming the exit pupil S of the optical system 1.

Figure 13:
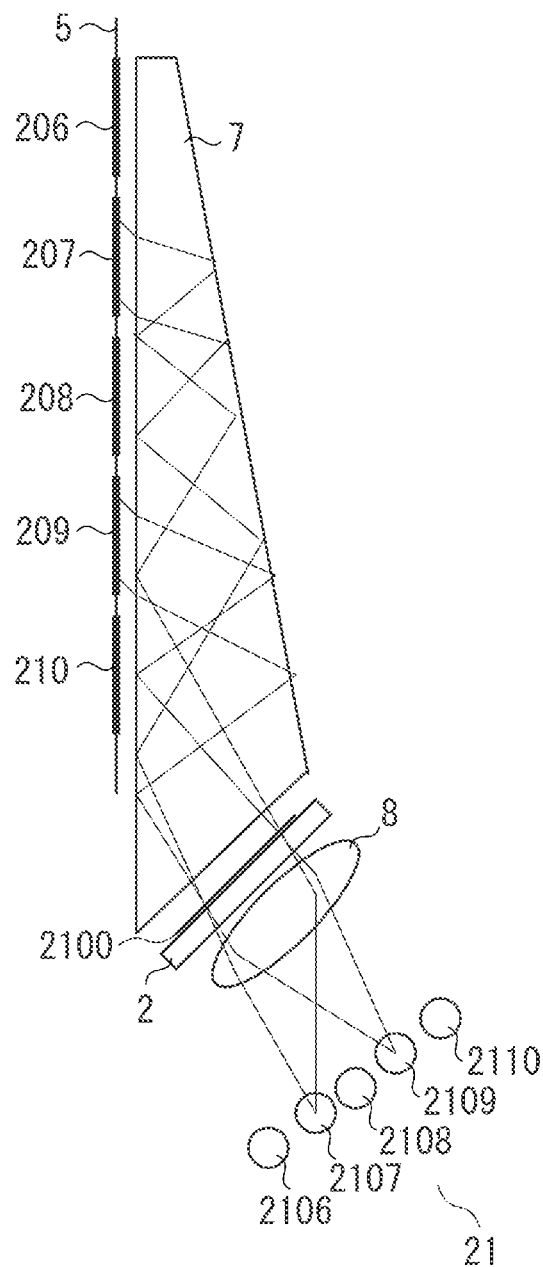
FIG. 13 is a sectional view illustrating a system for forming image elements according to a seventh exemplary embodiment of the present invention.

Hereinafter, a seventh exemplary embodiment will be described. FIG. 13 is a sectional view illustrating a system for forming image elements according to the seventh exemplary embodiment of the present invention. The configuration illustrated in FIG. 13 includes a light source 21, which includes a plurality of luminous points 2106 to 2110 arranged along the illustrated section, an image display element 2 constituted, for example, by a transmissive liquid crystal, an original image 2100 formed on the image display element 2, an illumination optical system 8 for collimating light from the light source 21, a light guide element 7 serving as a second optical system, and a screen 5.

The seventh exemplary embodiment differs from the fifth exemplary embodiment in a configuration for forming image elements on the screen 5, and the configuration for the processes thereafter is the same as that in the fifth exemplary embodiment. Thus, the depiction and the description thereof will not be repeated. In the seventh exemplary embodiment, the image elements 201 to 215 are formed on the screen 5 by the light source 21 having the plurality of luminous points 2106 to 2110, the illumination optical system 8, and the light guide element 7 serving as the second optical system, based on the original image 2100 formed on the image display element 2.

Formation of the image elements along the section illustrated in FIG. 13 will now be described. Rays from the luminous points 2106 to 2110 of the light source 21 are collimated by the illumination optical system 8 and illuminate the image display element 2 in respectively different directions. The collimated rays that have been modulated by the original image 2100 on the image display element 2 are incident on the light guide element 7. Within the light guide element 7, the collimated rays are reflected internally within the light guide element 7 in accordance with respective angles of incidence that differ depending on the respective luminous points 2106 to 2110 of the light source 21. Then, the collimated rays are emitted from the light guide element 7 at predetermined positions, respectively, to form the image elements 206 to 210 on the screen 5.

The light source 21 includes luminous points 2101 to 2105 and 2111 to 2115, aside from the luminous points 2106 to 2110 arranged along the section illustrated in FIG. 13, and the image elements 201 to 205 and 211 to 215 are formed on the screen 5 via the same mechanism. These image elements 201 to 215 are recognized as a magnified virtual image in the same mechanism as that in the first exemplary embodiment.

According to the configuration of the seventh exemplary embodiment, the plurality of image elements are formed via the optical system using the image display element a pixel count of which is smaller than a pixel count necessary for forming the plurality of image elements. Accordingly, the production cost of the image display element can be reduced.

Figure 14:
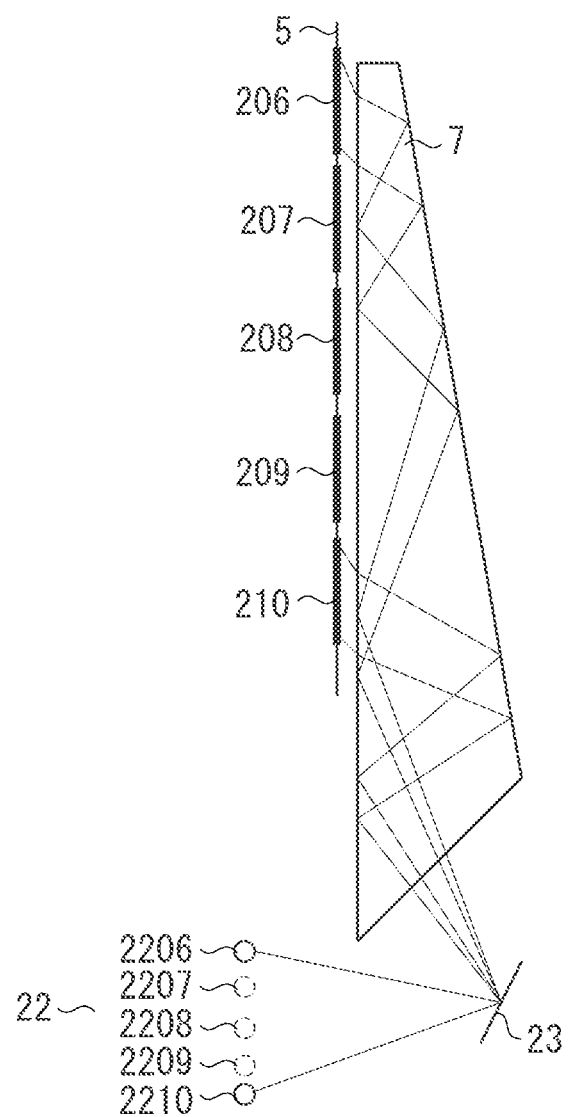
FIG. 14 is a sectional view illustrating a system for forming image elements according to an eighth exemplary embodiment of the present invention.

Hereinafter, an eighth exemplary embodiment will be described. FIG. 14 is a sectional view illustrating a system for forming image elements according to the eighth exemplary embodiment of the present invention. The configuration illustrated in FIG. 14 includes a beam generation unit 22, which includes a plurality of beam generation openings 2206 to 2210 arranged along the illustrated section, a two-dimensional scanning unit 23, a light guide element 7 serving as a second optical system, and a screen 5. The beam generation unit 22 and the scanning unit 23 collectively realize a function of forming a plurality of image elements at a predetermined location.

The eighth exemplary embodiment differs from the fifth exemplary embodiment in a configuration for forming image elements on the screen 5, and the configuration for the processes thereafter is the same as that in the fifth exemplary embodiment. Thus, the depiction and the description thereof will not be repeated. In the eighth exemplary embodiment, image elements 201 to 215 are formed on the screen 5 by the beam generation unit 22 having the plurality of beam generation openings 2206 to 2210, the scanning unit 23, and the light guide element 7 serving as the second optical system.

Formation of image elements along the section illustrated in FIG. 14 will now be described. A beam from each of the beam generation openings 2206 to 2210 of the beam generation unit 22 is modulated to form an image element of a predetermined size at a location distanced by a predetermined distance, in synchronization with the driving of the scanning unit 23. The beams emitted from the beam generation openings 2206 to 2210 and reflected by the scanning unit 23 are incident on the light guide element 7. Within the light guide element 7, the beams are reflected internally within the light guide element 7 in accordance with respective angles of incidence, which differ depending on each beam, on the scanning unit 23 from the beam generation unit 22. Then, the beams are emitted from the light guide element 7 at predetermined positions, respectively, to form the image elements 206 to 210 on the screen 5.

The beam generation unit 22 includes beam generation openings 2201 to 2205 and 2211 to 2215, aside from the beam generation openings 2206 to 2210 arranged along the section illustrated in FIG. 14, and the image elements 201 to 205 and 211 to 215 are formed on the screen 5 via the same mechanism. These image elements 201 to 215 are recognized as a magnified virtual image in the same mechanism as that in the first exemplary embodiment.

According to the configuration of the eighth exemplary embodiment, it is desirable that the beams emitted from the respective beam generation openings have respectively different beam generation sources and are modulated individually. With such a configuration, distortion in the image elements 201 to 215 can be suppressed, and high-quality image elements can be formed. According to the configuration of the eighth exemplary embodiment, a plurality of beam generation sources and a single scanning unit are used to form a plurality of image elements. Thus, although the beam generation sources are provided in a plurality, a plurality of image elements is formed with a single scanning unit. Thus, the production cost of the scanning unit can be reduced.

Figure 15:
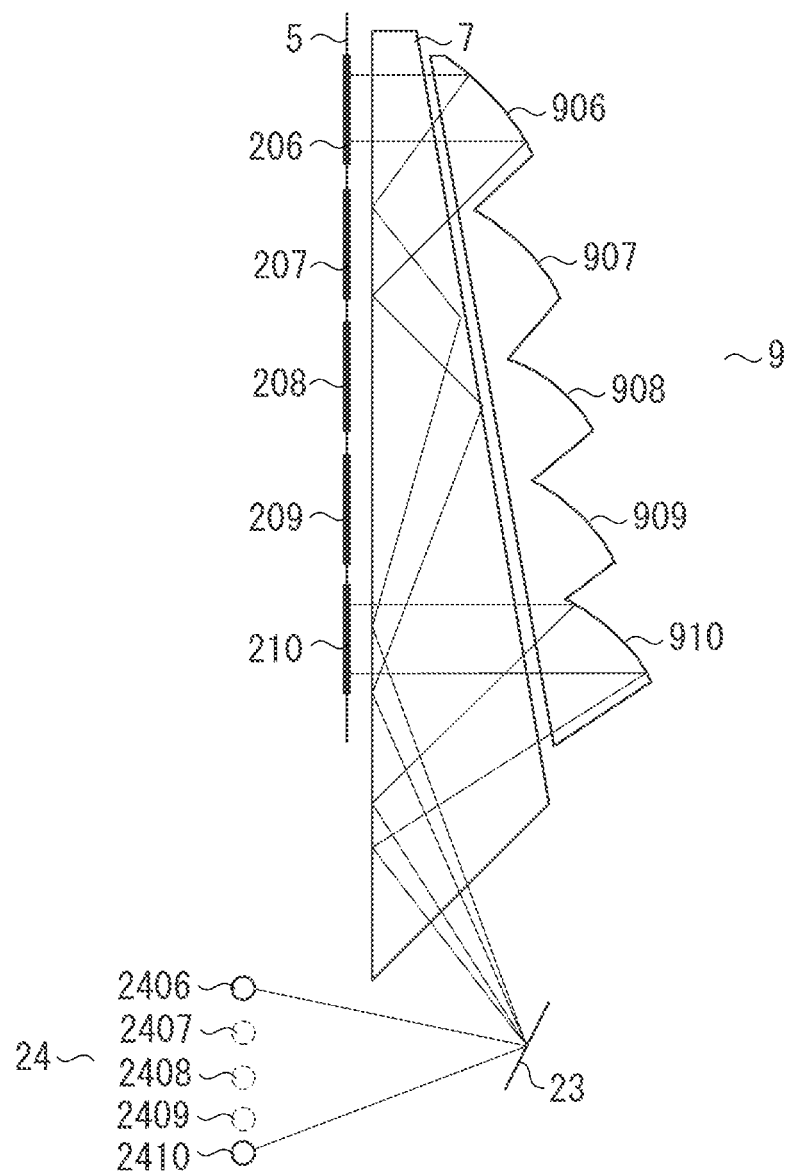
FIG. 15 is a sectional view illustrating a system for forming image elements according to a ninth exemplary embodiment of the present invention.
Figure 16:
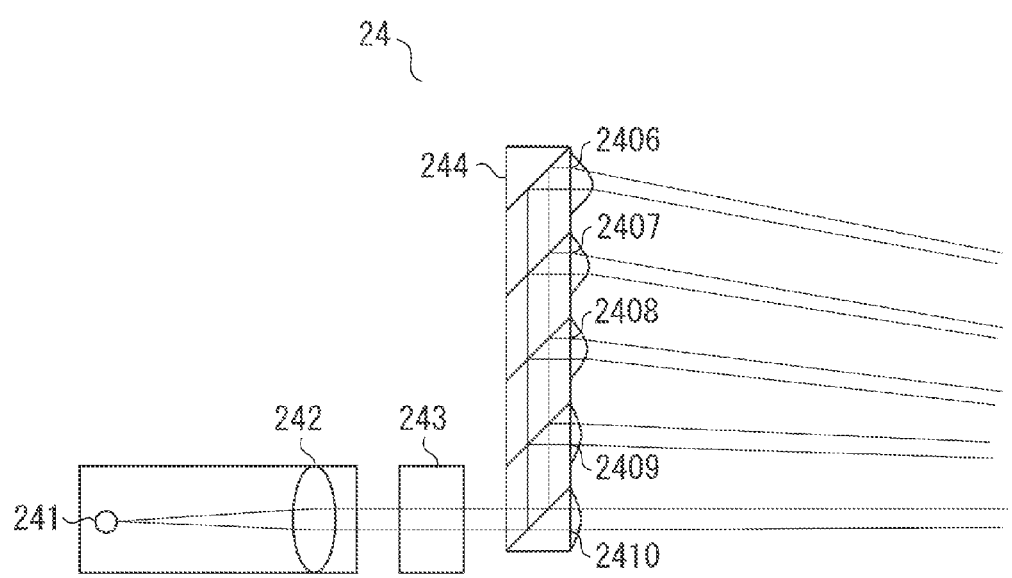
FIG. 16 illustrates a configuration example of a beam generation unit according to the ninth exemplary embodiment of the present invention.

Hereinafter, a ninth exemplary embodiment will be described. FIG. 15 is a sectional view illustrating a system for forming image elements according to the ninth exemplary embodiment of the present invention. FIG. 16 illustrates a configuration example of a beam generation unit according to the ninth exemplary embodiment. The configuration illustrated in FIGS. 15 and 16 includes a beam generation unit 24, which includes a plurality of beam generation openings 2406 to 2410 arranged along the illustrated section, a two-dimensional scanning unit (scanning mirror) 23, a light guide element 7, an optical element 9 having concave mirrors 906 to 910, a screen 5, a light-emitting element 241, a collimator 242, and a beam split forming element 243. The beam generation unit 24 and the scanning unit 23 collectively realize a function of forming image elements at a predetermined location. The light guide element 7 and the optical element 9 collectively constitute a second optical system of the ninth exemplary embodiment.

The ninth exemplary embodiment differs from the fifth exemplary embodiment in a configuration for forming image elements on the screen 5, and the configuration for the processes thereafter is the same as that in the fifth exemplary embodiment. Thus, the depiction and the description thereof will not be repeated. In the ninth exemplary embodiment, image elements 201 to 215 are formed on the screen 5 by the beam generation unit 24 having the plurality of beam generation openings 2406 to 2410, the scanning unit 23, and the second optical system constituted by the light guide element 7 and the optical element 9.

A beam from each of the beam generation openings 2406 to 2410 of the beam generation unit 24 is modulated to form an image element of a predetermined size at a location distanced by a predetermined distance, in synchronization with the driving of the scanning unit 23. The beams emitted from the beam generation openings 2406 to 2410 and reflected by the scanning unit 23 are incident on the light guide element 7. Within the light guide element 7, the beams are reflected internally within the light guide element 7 in accordance with respective angles of incidence, which differ depending on each beam, on the scanning unit 23 from the beam generation unit 24. Then, the beams are emitted from the light guide element 7 at predetermined positions and are incident on the optical element 9. The beams that are incident on the optical element 9 are reflected by the respective concave mirrors 906 to 910 and emitted from the optical element 9. Then, the beams pass through the light guide element 7 to form the image elements 206 to 210 on the screen 5.

The beam generation unit 24 includes beam generation openings 2401 to 2405 and 2411 to 2415, aside from the beam generation openings 2406 to 2410 arranged along the section illustrated in FIG. 15, and the image elements 201 to 205 and 211 to 215 are formed on the screen 5 via the same mechanism. These image elements 201 to 215 are recognized as a magnified virtual image in the same mechanism as that in the first exemplary embodiment.

Here, a specific configuration example of the beam generation unit 24 will be described with reference to FIG. 16. A beam from the light-emitting element 241, which emits a modulated beam in synchronization with the driving of the scanning unit 23, is substantially collimated by the collimator 242. The collimated beam is then split into three along the directions perpendicular to the paper surface by the beam split forming element 243. Of the split beams, a beam along the illustrated section is split by an optical element 244 having a beam splitter and a lens, and the split beams are emitted from the respective beam generation openings 2406 to 2410. Here, lenses in the beam generation openings 2406 to 2410 have respectively different powers and are in shift states that differ depending on the respective split beams. Thus, the beams are emitted at different concentrations and different exit angles.

According to the configuration of the ninth exemplary embodiment, a single light-emitting element is provided for generating a modulated beam for forming a plurality of image elements, and thus the number of light-emitting elements can be reduced compared to that in the eighth exemplary embodiment.

Figure 17:
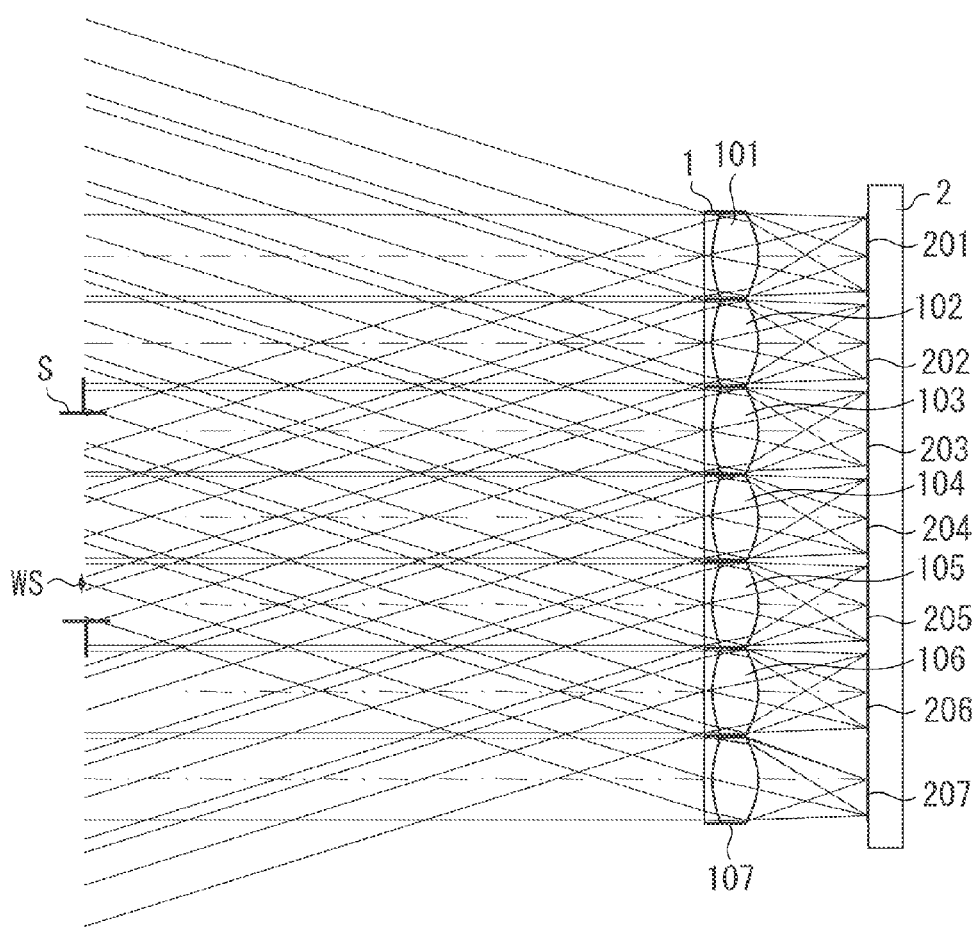
FIG. 17 is a sectional view illustrating a tenth exemplary embodiment of the present invention.

Hereinafter, a tenth exemplary embodiment will be described. FIG. 17 is a sectional view illustrating the tenth exemplary embodiment of the present invention. The tenth exemplary embodiment is basically the same as the first exemplary embodiment except for the number of image elements arranged along the illustrated section and except in that the optical elements 101, 102, and so on for forming the optical system 1 are each constituted by two lenses disposed in the optical axis direction. Thus, the description of the other components and the effects will not be repeated. The optical elements may each be constituted by a plurality of elements as in the tenth exemplary embodiment. If the optical elements are each constituted by a plurality of elements, the optical performance can be enhanced.

Further, when the thickness of an element of each optical element is increased in this manner, a gap is generated between substantially collimated light beams emitted from identical pixels of adjacent image elements. At this time, a width WS of the gap is desirably less than 2 mm.

In general, a person's pupil diameter is approximately 2 mm to 8 mm, and irrespective of the luminance, there is no vignetting of an image. Further, if the luminance of a viewing image is a few tens to a few hundreds cd/m$^2$, a person's pupil diameter is generally 3 mm to 4 mm. Accordingly, WS<2 mm is a condition in which a change in the luminance associated with the movement of the pupil is small. Furthermore, it is desirable to keep the width WS less than 1 mm so that the change in the luminance associated with the movement of the pupil is unnoticeable.

A first modification will be described. Rays from a single image element being incident on an optical element other than the corresponding optical element may cause a ghost. Therefore, it is desirable to provide a shading unit between the optical elements. More desirably, the shading unit is provided in a space between the image elements and the optical elements.

Figure 3:
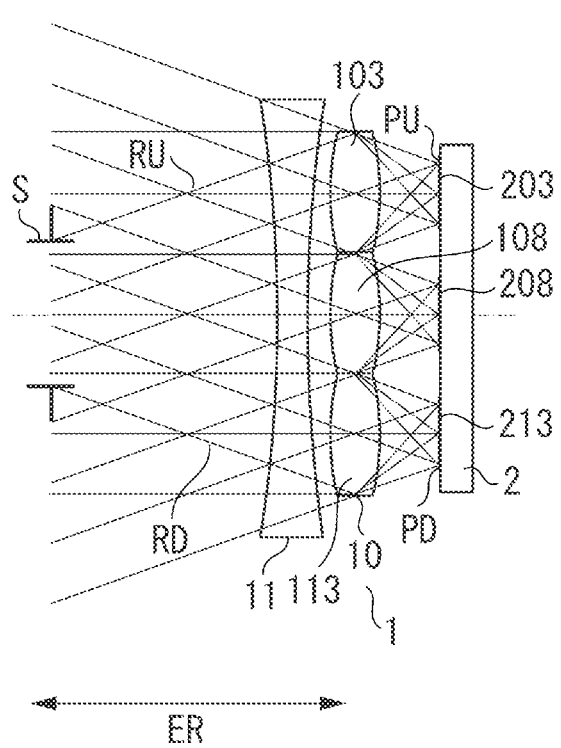
FIG. 3 illustrates a modification of the first exemplary embodiment of the present invention.
Figure 4:
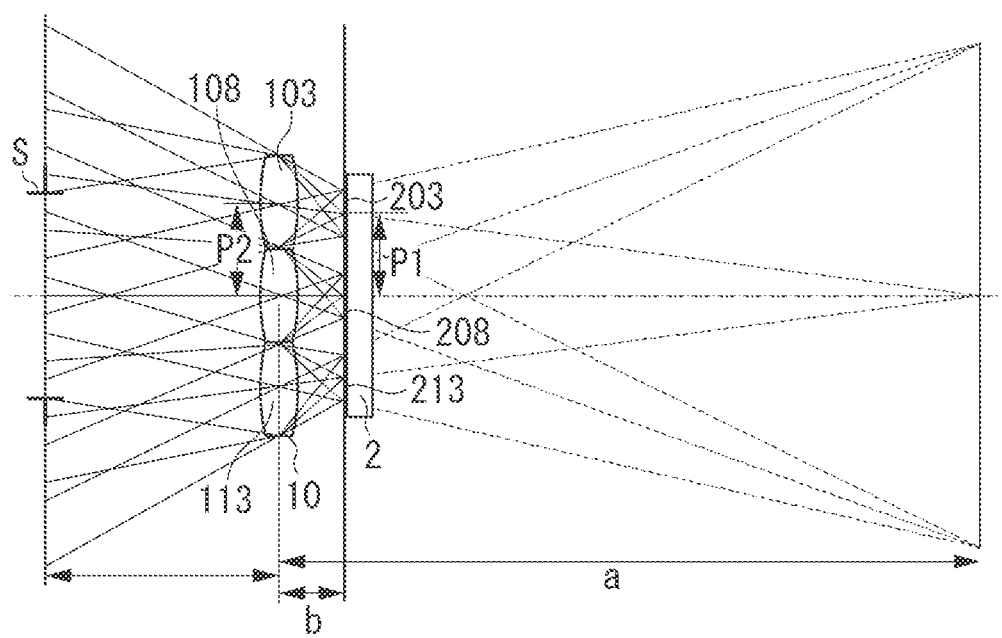
FIG. 4 illustrates another modification of the first exemplary embodiment of the present invention.

In addition, as illustrated in FIG. 3, the optical system 1 of the first exemplary embodiment may be formed by a lens array 10 and a concave lens 11 to set a location where a virtual image is formed at a finite distance. In addition, as illustrated in FIG. 4, the distance between the optical system 1 and the image display element 2 of the first exemplary embodiment may be set to a distance b that is equal to or less than the focal length, and a pitch P1 between the image elements and a pitch P2 between the optical elements may be set to satisfy the following relationship. Thus, the virtual image may be formed at a location of a finite distance a.

$$P1:P2=(a-b):a$$

Here, the distance a is the distance between the lens and the virtual image, and the distance b is the distance between the lens and the image.

A second modification will be described. In addition, although all of the optical elements are assumed to be ideal lenses in the first, second, and seventh exemplary embodiments, in reality, a lens has aberration. According to the stated exemplary embodiments, the image elements are formed on the respective image forming regions. Then, field curvature may be handled by setting display surface positions to differ in accordance with allocated regions for the corresponding image elements among images to be viewed in the end. Such a configuration enables higher quality image viewing. In addition, although all of the optical elements are assumed to have the same shape, the shape of each lens may be changed in accordance with allocated regions for the corresponding image elements among images to be viewed in the end. Such a configuration similarly enables higher quality image viewing.

A third modification will be described. In addition, although the single original image 2100 is illuminated by rays from the fifteen luminous points 2101 to 2115 in the seventh exemplary embodiment, the exemplary embodiments of the present invention is not limited thereto. Hereinafter, another mode will be described. In the following mode, an image in which three original images 2100 are arranged is displayed using an image display element 2 that has a three or more times greater pixel count arranged in a direction perpendicular to the section illustrated in FIG. 13, as compared to the seventh exemplary embodiment. First, a section that contains the luminous points 2101 to 2105 and the image elements 201 to 205 will be described. Along this section, the luminous points 2101 to 2105 are present at the same positions as the luminous points 2106 to 2110 in FIG. 13. Rays from the luminous points 2101 to 2105 are collimated by a lens that is the same as the illumination optical system 8 and illuminate another region in which the same image as the original image 2100 is displayed. Then, the rays are guided to the light guide element 7 and form the image elements 201 to 205 on the screen 5.

Subsequently, the section for the luminous points 2111 to 2115 will be described. In this case as well, rays from the luminous points 2111 to 2115 are collimated by a lens that is the same as the illumination optical system 8 and illuminate yet another region in which the same image as the original image 2100 is displayed. Then, the rays are guided to the light guide element 7 and form the image elements 211 to 215 on the screen 5. Although such a configuration increases the pixel count necessary for the image display element 2 by three folds than the above case, distortion in an image caused by being illuminated obliquely is suppressed, and thus image quality of the formed image elements improves.

Even with this configuration, the pixel count necessary for the image display element is smaller than the product of the viewed pixel count and the number of image elements to be formed in the end, and thus the production cost of the image display element can be reduced compared to the first exemplary embodiment. In addition, the above mode may be implemented using three image display elements 2.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-184012 filed Aug. 23, 2012, which is hereby incorporated by reference herein in its entirety.

What is claimed is:

1. An image display apparatus comprising:
an original image forming unit including a plurality of image forming regions configured to form an identical image in each of the image forming regions; and
an optical system including a plurality of optical elements arranged in a one-to-one correspondence with image forming regions,
wherein each of the plurality of optical elements is configured to convert a light beam from a region corresponding to the region among the image forming regions to a parallel light beam and guide the parallel light beam onto a viewer's eye,
wherein an exit pupil diameter D of the optical system satisfies $$D>2*[R*\sin(\omega)-Rp*\cos(\omega)]$$

where $\omega$ is a maximum angle of view in the image display apparatus, Rp is a radius of a pupil of the viewer's eye, and R is a distance from the rotational center of the eyeball to the pupil of the viewer's eye.

2. The image display apparatus according to claim 1, wherein a width of a light beam that is generated from one of the image forming regions and emitted from a corresponding one of the optical elements is less than a width of the exit pupil necessary for image viewing at an eye point.

3. The image display apparatus according to claim 1, wherein the image forming regions for respectively displaying the identical image include at least three image forming regions.

4. The image display apparatus according to claim 1, wherein the original image forming unit is configured to project an original image displayed on a single display unit onto a screen by a lens array and to form the identical images, and
wherein the display unit includes a pixel count that is smaller than a product of the number of the image forming regions for respectively displaying the identical image and a pixel count in each of the image forming regions.

5. The image display apparatus according to claim 1, wherein each of the optical elements includes a plurality of elements arranged in an optical axis direction.

6. The image display apparatus according to claim 1, wherein each of the optical elements includes a lens having a focal length, and
wherein each optical element is distanced from a corresponding image forming region by the focal length of the lens.

7. The image display apparatus according to claim 1, wherein the plurality of image forming regions are configured to display identical images.

8. An image display apparatus comprising:
an original image forming unit including plural image forming regions configured to form an image in each of the image forming regions; and
an optical system including plural optical elements arranged in a one-to-one correspondence with image forming regions,
wherein each of the plurality of optical elements is configured to convert a light beam from a region corresponding to the region among the image forming regions to a parallel light beam and guide the parallel light beam onto a viewer's eye,
wherein and an exit pupil diameter D of the optical system satisfies $$D>2*[R*\sin(\omega)-Rp*\cos(\omega)]$$

where $\omega$ is a maximum angle of view in the image display apparatus, Rp is a radius of a pupil of the viewer's eye, and R is a distance from the rotational center of the eyeball to the pupil of the viewer's eye, and
wherein one image displayed in one image forming region among the plurality image forming regions is identical to another image displayed in another image forming region among the plurality image forming regions.

9. The image display apparatus according to claim 1, wherein a distance between two parallel light beams adjacent to one another among a plurality of light beams emitted from the plurality of optical elements is less than 2 mm.

* * * * *